United States Patent [19]
Douhet

[11] Patent Number: 6,020,914
[45] Date of Patent: Feb. 1, 2000

[54] TERMINAL FOR AUDIO-VIDEO COMMUNICATION

[75] Inventor: Gérard Douhet, Fegersheim, France

[73] Assignee: Alcatel, Paris, France

[21] Appl. No.: 08/956,937

[22] Filed: Oct. 23, 1997

[30] Foreign Application Priority Data

Oct. 23, 1996 [EP] European Pat. Off. .............. 96440091

[51] Int. Cl.[7] .................................................. H04N 7/14
[52] U.S. Cl. .................................. 348/14; 348/15; 348/16
[58] Field of Search ................................. 348/14, 15, 16, 348/17, 18

[56] References Cited

U.S. PATENT DOCUMENTS

| | | | |
|---|---|---|---|
| 4,370,515 | 1/1983 | Donaldson | 361/424 |
| 4,910,434 | 3/1990 | Doumani et al. | 315/3 |
| 5,436,654 | 7/1995 | Boyd et al. | 348/14 |
| 5,444,476 | 8/1995 | Conway | 348/15 |
| 5,488,766 | 2/1996 | Gerry | 29/600 |
| 5,724,106 | 3/1998 | Autry et al. | 348/734 |
| 5,734,414 | 3/1998 | Nishimura et al. | 348/14 |

FOREIGN PATENT DOCUMENTS

| | | |
|---|---|---|
| 0670661 | 9/1995 | European Pat. Off. . |
| 2286311 | 8/1995 | United Kingdom . |

OTHER PUBLICATIONS

"Alcatel 2838; See the world from your desktop", Alcatel Company Brochure Sep. 1994.
"Color–Still Viedophone Terminal for ISDN", T. Nakao et al, IEEE 1989 International Conference on Consumer Electronics, Jun. 6–9 1989, Rosemont IL, pp. 24–25.
"Kamerasystem", in *Protector*, vol. 18, No. 1 (Mar. 1990), p. 93.

*Primary Examiner*—Paul Loomis
*Assistant Examiner*—Melur Ramakrishnaiah
*Attorney, Agent, or Firm*—Ware, Fressola, Van Der Sluys & Adolphson LLP

[57] ABSTRACT

A video communication terminal for setting up a video communication system which is compact and easy to install, which can be easily transported to different locations and which does not create EMI interference in spite of the compact design. The terminal (T) for video communication includes an electronically moveable camera (C) and a processor card (CP) with a corresponding video codec. The terminal is placed between a display screen (BS) and a respective telecommunication network. The camera (C) can be controlled via a remote control (FB) and comprises an autofocus. Special shielding (B) separating, for example, the camera (C) from the processor card (CP), is provided for suppressing EMI interference. The terminal (T) can be placed on top of the display screen (BS).

8 Claims, 2 Drawing Sheets

TERMINAL FOR AUDIO-VIDEO COMMUNICATION

BACKGROUND OF THE INVENTION

1. Technical Field of the Invention

The present invention relates to a terminal for video communication and, more particularly, to a unit of this type that includes a camera, a display, an interface to a communication network and corresponding coders/decoders

2. Discussion of Related Art

Terminals for video communication comprised of a stand-alone unit are known in the art. A unit of this type includes an integrated camera, a display, an interface to a communication network and also includes corresponding coders/decoders. Such units are mainly designed for video communication, i.e., for picture telephony, but they can also be used for making telephone calls without transmitting or receiving video. Such units, however, are relatively expensive and have to be acquired as a complete unit (Alcatel 2838: 'See the World from Your Desktop', company brochure, 09/1994).

SUMMARY OF THE INVENTION

It is the object of the invention to provide a terminal for video communication which can be easily installed and which is cost-effective and easy to handle.

It is another object of the invention to design the terminal for video communication such that it is compact and convenient.

According to the invention, a terminal for video communication comprises a camera and motors for moving the camera in two degrees of freedom, a receiver for receiving control signals for controlling the camera and the motors, a first interface for interfacing the terminal to a communications network, and a second interface for interfacing the terminal to a monitor, a microphone, a processor card for carrying out video coding/decoding and audio coding/decoding, and electromagnetic interference shielding for separating radio-frequency components from other components within the terminal and for preventing the radio-frequency components from emitting radiation to the surrounding environment.

The unit is advantageously constructed so that it can be installed quickly at any location by using already existing means, such as an already existing display monitor, and that only an additional small unit has to be installed for attaining high-quality picture telephony.

Advantageously, a unit of this type is also designed to be compact so that all important functions are combined in the terminal while, at the same time, EMI emission problems are averted.

It is also advantageous that the camera can be tilted in two mutually perpendicular axes by using motors, and that the camera is thus capable of capturing a high-quality picture of any user and to transmit such pictures.

Additional advantageous embodiments are disclosed and claimed below.

One advantageous feature is to enable additional devices to be interfaced easily so that the terminal for video communication can be expanded in any manner desired.

Another feature advantageously provides a loudspeaker for indicating that a caller has transmitted a ringer signal and that the caller wishes to initiate a video communication. Consequently, telephone calls can also be made directly via the terminal for video communication. It is an additional advantage that no additional loudspeakers have to be provided if an existing loudspeaker is used.

According to yet another feature, a safe and reliable EMI shielding is advantageously provided.

According to still another advantageous feature, the terminal for video communication can be controlled via a remote control. This may be a conventional remote control for a television unit.

BRIEF DESCRIPTION OF THE DRAWING

In the following, the invention will be discussed in greater detail with respect to embodiments and the figures. In the drawings is shown.

DETAILED DESCRIPTION OF PREFERRED EMBODIMENTS

Figure 1:
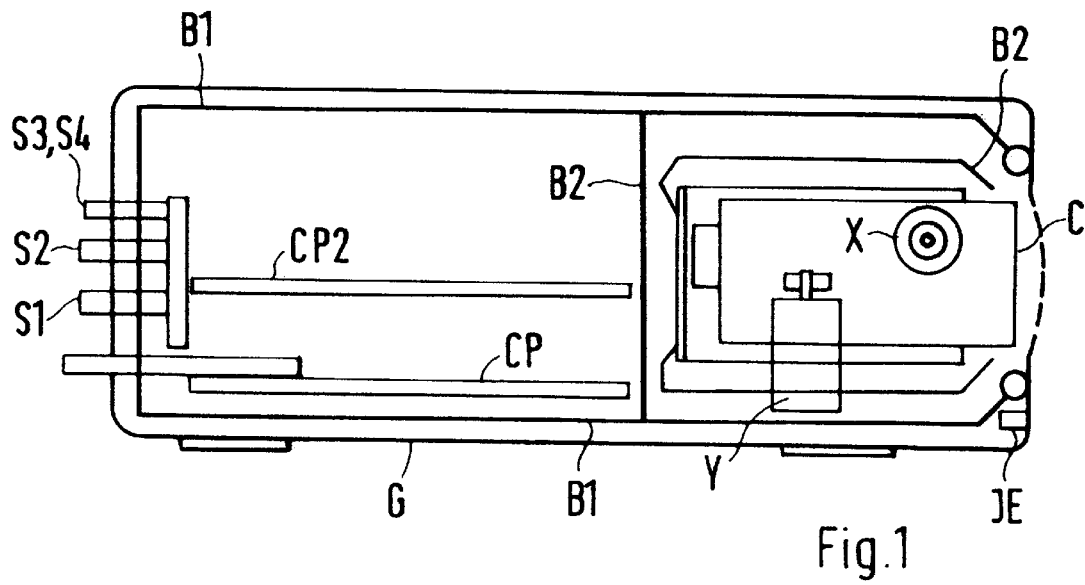
FIG. 1 a cross sectional view of the terminal for video communication.

The invention will be described hereinafter in greater detail with reference to FIG. 1. A terminal T for video communication has a camera C. On the camera C, there are disposed motors X, Y for moving the camera C in two degrees of freedom. In the present example, the motor Y moves the camera about a horizontal axis to tilt in the vertical direction and the motor X moves the camera perpendicular thereto to tilt about a vertical axis in the horizontal direction. Since the two motors X, Y move the camera in two mutually perpendicular directions, the camera can be moved so as to point in any direction in space. In addition, the camera can provide zoom or autofocusing functions, i.e., automatic focusing, for bringing a subject whose picture is to be taken into focus so that a sharp picture can be transmitted. In addition, the terminal T for video communication has a receiver IE for receiving control signals for controlling the camera and the motors. The receiver IE, which can be an infrared receiver, converts signals, such as the signals transmitted by the remote control, into control signals for controlling the camera and the motors.

In addition, the terminal T for video communication has a first interface S1 for interfacing the terminal T to a communication network ISDN. The terminal T for video communication furthermore has a second interface S2 for interfacing the terminal T to a display monitor BS. The terminal T for video communication can, for example, be interfaced to a monitor of a PC or to a monitor of a TV receiver, i.e., a television screen.

The terminal T for video communication also includes a processor card CP for carrying out video coding/and decoding as well as audio coding/and decoding. Additional components are located on the processor card which will be discussed below with reference to FIG. 3. Additional cards CP2 can also be provided in addition to the processor card CP. These additional cards CP2 can, for example, be inserted in parallel with the processor card CP and are designed to provide additional functions.

In addition, the terminal T for video communication has EMI shielding B1, B2 for shielding high frequency components located inside the terminal T from other components and also for preventing the high frequency components from radiating to the outside. The EMI shielding B1 encloses the entire assembly described above, with only the interfaces projecting to the outside. This first EMI shielding B1 is comprised at least in part of transparent material. The transparent material is disposed in front of the camera lens so that images can be taken through the transparent material. The EMI shielding is comprised of a second EMI shielding B2 which shields or isolates the high frequency section inside the terminal T from other elements. Consequently, the shielding B2 completely encloses the motor X and the motor Y as well as the camera, i.e., all movable parts. This arrangement is shown in FIG. 1 in form of two sections. The EMI shielding thereby separates radio-frequency components from other components within the terminal and prevents RF components from emitting radiation to the surrounding environment. The processor card CP is connected here through a slot in the EMI shielding B2. The EMI shielding is typically made of a highly conductive material. Typically, thin films or plates made of iron or galvanized iron or of copper or of aluminum are used for this purpose. If the terminal T for video communication is designed as a desktop box, then an additional housing G is provided. Aside from the first interface S1 for interfacing the terminal and the second interface S2, additional interfaces S3, S4 can be provided for interfacing, for example, a video recorder and/or an additional camera, and/or a data processing terminal. This makes the unit easily expandable and more user-friendly.

Figure 2:
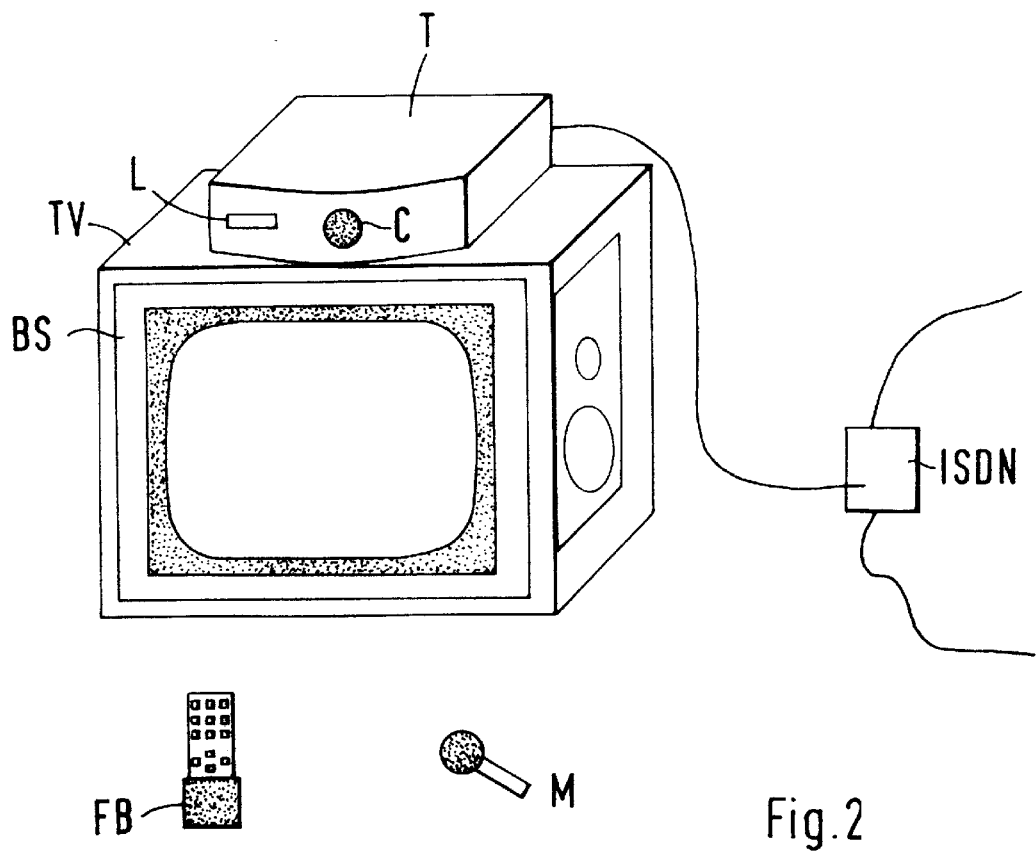
FIG. 2 a schematic illustration of a terminal for video communication when used as a picture telephone, FIG. 3 a processor card and the interfacing thereof with the terminal.

Referring now to FIG. 2, there is shown a complete setup to be used as a terminal T for video communication. The Figure shows the terminal T for video communication implemented in form of a set-top box. Instead of the set-top box, the terminal of the invention can also be designed so that it can be built into or plugged into a housing containing a display. The terminal T for video communication—subsequently called set-top box T—is interfaced to the communication network ISDN via a subscriber line. As mentioned before, the set-top box T is also interfaced to a display screen BS. In the present example, a display screen BS of a TV receiver TV is shown. In addition, there is shown a remote control FB for controlling the set-top box T and for addressing the TV receiver TV. Also shown is a microphone M which is here associated with the set-top box T, but which is not located inside the device. In this way, a user of the device can control the set-top box even if the user is positioned a considerable distance away from the set-top box.

In the following, a possible application of the terminal T for video communication, i.e., of the set-top box T, will be discussed (no figure). A user of the set-top box T uses the remote control FB to switch on the set-top box T, the television receiver TV and thus the display screen BS. In the event of an incoming call, a ringing signal is provided through a loudspeaker L in the terminal T. Optionally, a text or an identification of the calling party can also be displayed on the display screen. The user then can accept the call via the remote control FB. Optionally, instead of providing the loudspeaker L inside the set-top box T, the existing loudspeaker of a TV receiver TV could also be used. If an incoming call is accepted, then the image is displayed on the display screen BS. A picture of the called subscriber is captured by the camera C and is also transmitted to the other subscriber via the communication network ISDN. The position of the camera C is changed with the remote control FB which controls the motors X, Y disposed on the camera C. These motors are, for example, designed to tilt about respective horizontal and vertical axes. In addition, the captured image can be focused by using zooming and/or manual focusing or autofocusing. The subscriber can also display his/her own image on the display BS and thereby control sharpness, illumination, orientation, etc., of his/her image.

Figure 3:
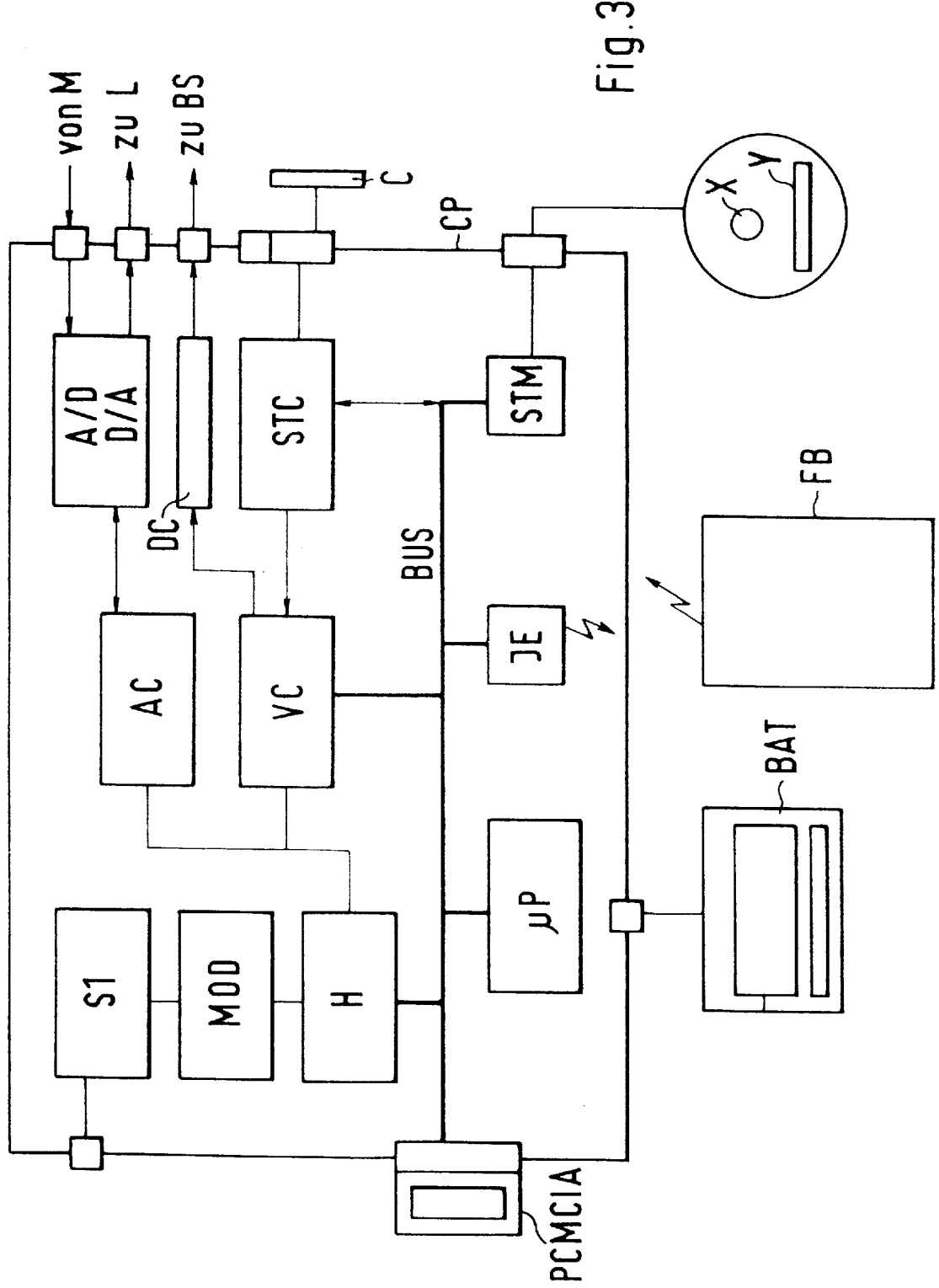

The processor card CP of the terminal for video communication T will be discussed hereinafter in detail with reference to FIG. 3. A processor card CP includes a processor $\mu P$, an infrared receiver IE, a controller STM for controlling motors X, Y of a camera, a video codec VC, an adapter circuit H, and a controller STC for controlling a camera C. The aforementioned components are all interfaced to each other via a bus BUS. The control circuit STM of the motors X, Y accesses the motors X, Y disposed outside the processor card CP. The video codec VC operates, for example, according to the ITU standard H.261 or H.263. In addition to the video codec VC, there is also provided an audio codec AC. The audio codec AC is operating, for example, according to the ITU standard G.711 or G.728, or G.723 or G.722, respectively. A communication link to a communication network, such as the ISDN network, can be established through a first interface S1. Moreover, incoming or outgoing signals are converted by a modem MOD and processed. This modem MOD may be an analog modem or in the case of an ISDN telecommunication network, a digital modem. Incoming or outgoing video and audio signals are then transmitted to the adapter circuit H which controls the two-way communication between the communicating video telephones. This adapter circuit H operates, for example, according to the ITU standard H.221 if a digital modem is used, or according to the ITU standard H.223 if an analog modem is used. From here, video signals and audio signals are transmitted in parallel, respectively to the video codec VC and to the audio codec AC for coding and decoding, respectively, the audio and video signals. Audio signals which have been coded or decoded by the audio codec AC, are transmitted to an analog/digital converter A/D or are received from the digital analog converter D/A. Incoming audio signals originating from an external microphone M or outgoing audio signals are transmitted to a loudspeaker L. For outputting the coded video signals, the video data are transmitted first to a decoder DC and then to the display screen BS.

The receiver IE for controlling the camera and the motors and for controlling the TV receiver, including a display, receives signals from an external remote control FB. A power supply BAT for the processor card CP is also provided. The power supply BAT supplies the processor card CP with electric power.

On the processor card there can also be provided means for receiving a PCMCIA card, PCMCIA, which is a memory card for expanding the memory. After insertion, the PCMCIA card, PCMCIA, is interfaced to the other means via the bus BUS. In this way, the processor $\mu P$ can access the memory directly for reading from or writing to the memory. Other cards or memory extensions can also be provided in addition to or instead of the PCMCIA card.

I claim:

1. A terminal (T) for audio-video communication, comprising:
    a camera (C) responsive to focus control signals, for providing a video input signal;
    motors (X, Y), responsive to motor command signals, for moving the camera (C) in two degrees of freedom;
    a monitor (BS), responsive to interfaced display command signals, for displaying video information;
    a first interface (S1), for interfacing the terminal (T) to a communications network (ISDN), for conveying modulated communication input signals and modulated communication output signals to the communications network (ISDN) and to the terminal (T), respectively;

a second interface (S2), for interfacing the terminal (T) to the monitor (BS), responsive to display command signals, for providing the interfaced display command signals;

a microphone (M), for providing audio input signals, responsive to audio input;

a loudspeaker (L), responsive to audio output signals, for providing audio output; and a processor card (CP), comprising:

a modem (MOD), for modulating and demodulating communication input and output signals, responsive to unmodulated communication output signals and to the modulated communication input signals, for providing the modulated communication output signals and demodulated communication input signals;

a receiver (IE) for receiving remote-control commands, for providing camera controller command signals and motor controller command signals;

a motor controller (STM), responsive to the motor controller command signals, for providing the motor control signals;

a camera controller (STC), responsive to the camera controller command signals, for providing the focus control signals;

a video codec (VC) and decoder (DC), in combination, responsive to coded video signals and to video input signals, for providing coded video signals and display command signals;

an audio codec (AC), responsive to coded audio signals and to digitized audio signals, for providing digitized audio signals and coded audio signals;

an analog to digital converter (A/D), responsive to audio input signals, for providing the digitized audio signals;

a digital to analog converter (D/A), responsive to the digitized audio signals, for providing audio output signals; and an adapter circuit (H), for controlling two-way audio-video communication between the terminal (T) and a compatible terminal of the communications network (ISDN), responsive to the coded video signals and to the coded audio signals, for providing the unmodulated communication output signals, and also responsive to the unmodulated communication input signals, for providing the coded video signals and the coded audio signals, in parallel;

wherein electromagnetic interference (EMI) shielding (B1, B2) is provided for separating radio-frequency components from other components within the terminal and for preventing the radio-frequency components from emitting radiation to the surrounding environment, and further wherein a user of said terminal (T) is able to focus the camera (C) on the user by viewing the image produced by the camera (C) on the monitor (BS) and adjusting as necessary how the camera (C) is focused.

2. A terminal as claimed in claim 1, comprising at least one additional interface (S3, S4) for interfacing a video recorder and/or a further camera and/or a dataprocessing terminal.

3. A terminal as claimed in claim 1, wherein the loudspeaker (L) generates a ringing signal in response to a call from a calling subscriber.

4. A terminal as claimed in claim 1, further comprising a first EMI shield (B1), which entirely encloses the terminal (T) and is made, at least in part, of a transparent material, and a second EMI shield (B2) which inside the terminal (T) separates radio-frequency components from other components comprising moveable elements.

5. A terminal as claimed in claim 1, comprising an infrared transmitter (IS) for transmitting control signals to the receiver (IE).

6. A terminal as claimed in claim 1, wherein the terminal is implemented in the form of a set-top box.

7. A terminal as claimed in claim 1, wherein the terminal is built directly into a housing of the monitor (BS) or is directly plugged into the housing of the monitor (BS).

8. A terminal (T) for audio-video communication, comprising:

a camera (C), for recording an image of a user of the terminal (T), coupled to a camera controller (STC);

motors (X, Y), for moving the camera (C) in two degrees of freedom, coupled to a motor controller (STM);

a monitor (BS), for displaying video information, coupled to a video codec (VC) and decoder (DC), in combination, through a display interface (S2);

a communication interface (S1), for interfacing the terminal (T) to a communications network (ISDN);

a microphone (M), for inputting audio information, coupled to an analog to digital converter (A/D);

a loudspeaker (L), for outputting audio information, coupled to a digital to analog converter (D/A); and a processor card (CP), comprising:

a modem (MOD), for modulating and demodulating communication input and output signals, coupled to the communication interface (S1) and to an adapter circuit (H);

a receiver (IE) for receiving camera controller commands and motor controller commands, coupled to a camera controller (STC) and to a motor controller (STM);

the motor controller (STM), for controlling the motors (X, Y), coupled to the motors (X, Y) and to the receiver (IE);

the camera controller (STC), for controlling focus of the camera (C), coupled to the camera (C) and to a video codec (VC);

the video codec (VC) and a decoder (DC), in combination, for coding and decoding video information, coupled to the video interface (S2), coupled to the camera controller (STC), and also coupled to the adapter circuit (H);

an audio codec (AC), for coding and decoding audio information, coupled to an analog to digital converter (A/D), coupled to a digital to analog converter (D/A), and also coupled to the adapter circuit (H); and the analog to digital converter (A/D), for digitizing analog audio signals, coupled to the microphone (M) and coupled to the audio codec (AC);

the digital to analog converter (D/A), for converting digital audio signals into analog audio signals, coupled to the audio codec (AC) and coupled to the loudspeaker (L); and the adapter circuit (H), for controlling two-way audio-video communication between the terminal (T) and a compatible terminal of the communications network (ISDN), coupled to the video codec (VC) and decoder (DC) in combination, coupled to the audio codec (AC), and also coupled to the modem (MOD);

wherein a first electromagnetic interference (EMI) shield (B1) is provided so as to entirely encloses the terminal (T)

and is made, at least in part, of a transparent material, and a second EMI shield (B2) is provided inside the terminal (T) so as to separate radio-frequency components from other components comprising moveable elements, and further wherein a user of said terminal (T) is able to focus the camera (C) on the user by viewing the image produced by the camera on the monitor (BS) and adjusting as necessary how the camera is focused.

* * * * *